United States Patent
Ruprecht et al.

(10) Patent No.: US 10,060,825 B2
(45) Date of Patent: Aug. 28, 2018

(54) APPARATUS AND METHOD FOR MEASURING A WAVELENGTH-DEPENDENT OPTICAL CHARACTERISTIC OF AN OPTICAL SYSTEM

(71) Applicant: TRIOPTICS GmbH, Wedel (DE)

(72) Inventors: Aiko Ruprecht, Hamburg (DE); Patrik Erichsen, Hetlingen (DE); Daniel Winters, Traun (AT)

(73) Assignee: TRIOPTICS GMBH, Wedel (DE)

(*) Notice: Subject to any disclaimer, the term of this patent is extended or adjusted under 35 U.S.C. 154(b) by 5 days.

(21) Appl. No.: 15/255,490

(22) Filed: Sep. 2, 2016

(65) Prior Publication Data

US 2017/0059447 A1 Mar. 2, 2017

(30) Foreign Application Priority Data

Sep. 2, 2015 (EP) .................................... 15002589

(51) Int. Cl.
| | | |
|---|---|---|
| *G01J 3/28* | (2006.01) | |
| *G01M 11/02* | (2006.01) | |
| *G01J 3/02* | (2006.01) | |
| *G01J 3/14* | (2006.01) | |

(52) U.S. Cl.
CPC ....... *G01M 11/0292* (2013.01); *G01J 3/0229* (2013.01); *G01J 3/14* (2013.01); *G01J 3/2803* (2013.01); *G01M 11/0285* (2013.01)

(58) Field of Classification Search
CPC .......... G01M 11/0292; G01M 11/0285; G01J 3/0229; G01J 3/14; G01J 3/2803

USPC ......................................................... 356/326
See application file for complete search history.

(56) References Cited

U.S. PATENT DOCUMENTS

| | | | |
|---|---|---|---|
| 5,657,116 A | 8/1997 | Kohayakawa | |
| 7,688,431 B1 | 3/2010 | Balch et al. | |
| 8,498,048 B2* | 7/2013 | Wilson ................. | G02B 21/006 |
| | | | 359/368 |
| 9,733,063 B2* | 8/2017 | Proll ....................... | G01B 9/02 |
| 2001/0046046 A1* | 11/2001 | Schoeppe ................. | G01J 3/02 |
| | | | 356/318 |
| 2002/0044272 A1* | 4/2002 | Basiji ........................ | G01J 3/02 |
| | | | 356/73 |
| 2002/0139920 A1* | 10/2002 | Seibel ................... | A61B 1/0008 |
| | | | 250/208.1 |
| 2003/0137655 A1* | 7/2003 | Wegmann .......... | G01M 11/0285 |
| | | | 356/124 |

* cited by examiner

*Primary Examiner* — Hina F Ayub
(74) *Attorney, Agent, or Firm* — Lucas & Mercanti, LLP; Klaus P. Stoffel (57) ABSTRACT

An apparatus for measuring a wavelength-dependent optical characteristic of an optical system has a light-pattern generation device which generates a pattern of polychromatic light in an object plane. Together with the optical system, a measuring optical unit images the object plane on a spatially resolving light sensor. A dispersive optical element is arranged in a light path between the optical system and the light sensor in such a way that a plurality of images of the pattern with different wavelengths are generated simultaneously on the light sensor. The evaluation device determines the wavelength-dependent characteristic of the optical system from the plurality of images on the light sensor.

23 Claims, 5 Drawing Sheets

Fig. 12

APPARATUS AND METHOD FOR MEASURING A WAVELENGTH-DEPENDENT OPTICAL CHARACTERISTIC OF AN OPTICAL SYSTEM

CROSS-REFERENCE TO RELATED APPLICATIONS

The present application claims priority of EP 150 02 589.8, filed Sep. 2, 2015, the priority of this application is hereby claimed and this application is incorporated herein by reference.

BACKGROUND OF THE INVENTION

1. Field of the Invention

The invention relates to an apparatus and a method for measuring a wavelength-dependent optical characteristic of an objective, a lens or any other optical system. In particular, the wavelength-dependent optical characteristic can be the spectral modulation transfer function (MTF), the spectral transmission coefficient $T(\lambda)$, the longitudinal chromatic aberration or the transverse chromatic aberration.

2. Description of the Prior Art

The prior art has disclosed apparatuses for measuring the modulation transfer function of an optical system, in which a light pattern, e.g. a line, a lined cross or a point, is generated in a focal plane of the optical system. To this end, it is possible, for example, to arrange a stop in the focal plane of the optical system, which stop is illuminated by a light source and has a corresponding aperture. The optical system images the aperture to infinity.

A camera with a lens and a light sensor, which is arranged in a focal plane of the lens, is arranged on the opposite side of the optical system. The object images the image from infinity on the light sensor. The modulation transfer function can be derived from the image on the light sensor. Moreover, it is known to use a stop with a plurality of apertures and arrange a plurality of cameras on the opposite side of the optical system with such a distribution that each camera acquires, with a light sensor thereof, the image from exactly one aperture. In this way, it is possible to measure the modulation transfer function at a plurality of field positions independently of one another.

Moreover, apparatuses are known, in which the stop with the pattern of apertures is imaged to infinity by a collimator such that the optical system to be measured is illuminated in a collimated manner. Then, the lens of the camera images an intermediate image of the stop, which is generated by the optical system, on the light sensor.

In order to determine the modulation transfer function for different wavelengths so as to derive the spectral modulation transfer function $MTF(\lambda)$ therefrom, use has previously been made of light sources, the emission spectra of which can be changed in a discrete manner. Such a light source can e.g. have a plurality of LEDs with different emission wavelengths, which are successively introduced into the light path. As an alternative thereto, use is made of white-light sources, the light of which is filtered by color filters which are interchangeably arranged in the light path. The modulation transfer function is then measured separately in succession for each wavelength.

However, such a measurement is too slow if optical systems are intended to be measured in great numbers in applications close to production.

For the purposes of measuring the spectral transmission coefficient $T(\lambda)$, measurement light is directed onto a slit after passing through the optical system, said slit being imaged on a light sensor via a prism, a grating or any other dispersive optical element.

SUMMARY OF THE INVENTION

It is therefore an object of the invention to specify an apparatus by means of which the wavelength-dependent modulation transfer function or any other optical characteristic of an optical system can be measured more quickly than was previously possible.

This object is achieved by an apparatus for measuring a wavelength-dependent optical characteristic of an optical system which has a light-pattern generation device configured to generate a pattern of polychromatic light in an object plane. The apparatus moreover has a spatially resolving light sensor and a measuring optical unit configured, together with the optical system, to image the object plane on the light sensor. According to the invention, a dispersive optical element is arranged in a light path between the optical system and the light sensor in such a way that a plurality of images of the pattern with different wavelengths are generated simultaneously on the light sensor. An evaluation device is configured to determine the wavelength-dependent characteristic of the optical system from the plurality of images.

By using the polychromatic light and the dispersive element, it is possible to simultaneously acquire and evaluate the images of the pattern for different wavelengths. If the polychromatic light comprises a discrete spectrum or a plurality of (narrow) continuous spectra, which are spectrally spaced apart, this renders it possible, for example, to determine the modulation transfer function simultaneously for a plurality of different wavelengths.

Preferably, the optical system, together with the measuring optical unit, generates an intermediate image of the pattern which is imaged on the light sensor. According to the invention, this intermediate image is used as a type of virtual entrance gap for the light path of the subsequent spectrographic arrangement. In conventional spectrographs, the position of the physical entrance gap in relation to the dispersive optical element and the light sensor is set by the structural design. As a result, positions on the light sensor can be uniquely assigned to a wavelength. By contrast, the virtual entrance gap, which is generated in the apparatus according to the invention by the optical system and which may lie at a finite distance or else at infinity, is not spatially fixed in relation to the measuring optical unit, the dispersive optical element and the light sensor. As a result, the spatial information obtained by the light sensor only allows conclusions to be drawn to a restricted extent.

These problems can be redressed if the apparatus has a further spatially resolving light sensor and the measuring optical unit is configured, together with the optical system, to additionally image the object plane on the further light sensor, with no dispersive optical element being arranged in the beam path of the further light sensor. Then, the object of the further spatially resolving light sensor is predominantly that of acquiring the location of the image of the pattern generated by the optical system. The evaluation device can then be configured to derive wavelength-independent information from the image of the pattern on the further light sensor and use this information to correct the spatial information obtained by the light sensor.

It is also possible to use polychromatic light which comprises a broader continuous spectrum. The images of the pattern can then, in general, no longer be distinguished from one another on the light sensor. However, the spectral transmission coefficient of the optical system to be measured can easily be derived directly by the evaluation in terms of intensity of the spectrum acquired by the light sensor. Thus, for example, by changing the spectrum of the polychromatic light, it is possible to quickly change between a measurement of the spectral modulation transfer function for the selected wavelengths and the measurement of the spectral transmission coefficient over a relatively large wavelength range.

So that light is incident on the light sensor with a discrete spectrum or a plurality of continuous spectra spectrally separated from one another, use can be made of a light source which generates a continuous spectrum. Spectral filtering can then be effected in the light path of the light by way of an optical comb filter or any other spectral filter which, for example, can be arranged between the optical system to be measured and the light sensor.

A spectral filter may then also be expedient if the discrete wavelengths or the spectra spectrally separated from one another are spaced apart so closely from one another that the images of the pattern overlap on the light sensor. Then, images can be masked on the light sensor with the aid of a spectral filter such that other images can be better detected. Here, the spectral filter can be arranged in e.g. an interchange holder, in which there is at least one further spectral filter with different spectral properties. Then, different images on the light sensor can be masked quickly by interchanging the spectral filters.

In one embodiment, the measuring optical unit is configured to illuminate the optical system with collimated light. The measuring optical unit then preferably has a condenser, in the focal plane of which the pattern is arranged.

In order to be able to carry out an adaptation to the different focal lengths of the optical system to be measured, a part of the measuring optical unit arranged between the optical system and the light sensor can have a focal plane which is axially adjustable. For the purposes of the adjustment, it is possible to displace an individual lens, or else the whole measuring optical unit, along the optical axis of the optical system.

In another embodiment, the optical system generates an intermediate image of the pattern lying at infinity, which intermediate image is imaged on the light sensor by the measuring optical unit.

The light-pattern generation device can have a light source and a stop with an aperture which is illuminable by the light source. The use of self-luminous light patterns, e.g. an arrangement of LEDs, can also be considered for a light-pattern generation device.

In addition to the spectral modulation transfer function and the spectral transmission coefficient, it is also possible with the aid of the apparatus according to the invention to determine other spectral characteristics of the optical system, e.g. the longitudinal chromatic aberration or the transverse chromatic aberration.

It is moreover an object of the invention to specify a method and a device, by means of which the wavelength-dependent modulation transfer function or any other optical characteristic of an optical system can be measured more quickly than previously.

This object is achieved by a method for measuring a wavelength-dependent optical characteristic of an optical system, which comprises the following steps:

a) generating a pattern of polychromatic light in an object plane;

b) imaging the pattern on a spatially resolving light sensor using the optical system and a measuring optical unit, with a dispersive optical element being situated in a light path between the optical system and the light sensor such that a plurality of images of the pattern with different wavelengths are generated simultaneously on the light sensor;

c) determining the optical characteristics from the plurality of images on the light sensor.

The optical system can generate an intermediate image of the pattern which is imaged on the light sensor. The measuring optical unit, together with the optical system, can then additionally image the object plane on a further light sensor, with no dispersive optical element being arranged in the light path of the further light sensor. From the image of the pattern on the further light sensor, it is then possible to derive wavelength-independent information and use this information to correct the relationship between wavelengths and the locations on the one light sensor.

The polychromatic light can comprise a discrete spectrum or a plurality of continuous spectra, which are spectrally spaced apart.

The light can be spectrally filtered between the optical system and the light sensor.

In one embodiment, the measuring optical unit illuminates the optical system with collimated light. To this end, the measuring optical unit can have a condenser, in the focal plane of which the pattern is arranged. Here, a part of the measuring optical unit arranged between the optical system and the light sensor can have a focal plane which is axially adjustable.

In another embodiment, the optical system generates an intermediate image of the pattern lying at infinity, which intermediate image is imaged on the light sensor by the measuring optical unit. For the purposes of generating the pattern, a light source can illuminate a stop with an aperture.

The optical characteristic can be the spectral modulation transfer function, the spectral transmission coefficient, the longitudinal chromatic aberration or the transverse chromatic aberration.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

Further features and advantages of the invention emerge from the following description of the embodiments on the basis of the drawings. In detail.

DETAILED DESCRIPTION OF THE INVENTION

1. First Embodiment a) Set Up

Figure 1:
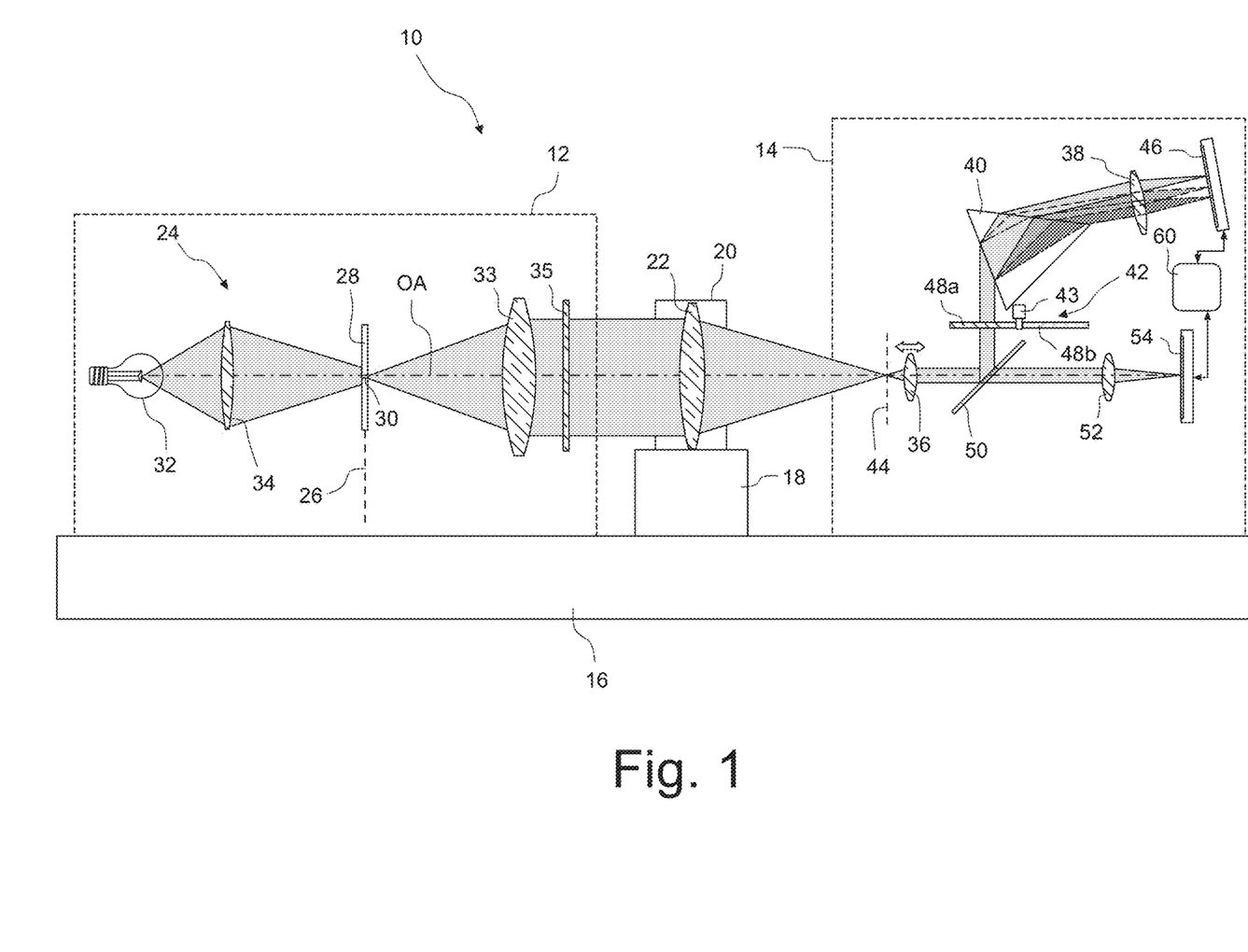
FIG. 1 shows a measuring apparatus according to the invention in a schematic meridional section in accordance with a first embodiment.

FIG. 1 shows, in a schematic meridional section, a measuring apparatus according to the invention, which is denoted by 10 overall.

The measuring apparatus 10 comprises an illumination unit and a measuring unit 14, which are fastened to a common carrier 16. The carrier 16 moreover carries a holder 18, which is arranged between the illumination unit 12 and the measuring unit 14 and which is embodied to receive an optical system 20 to be measured. In the depicted embodiment, the optical system comprises merely a single lens 22; naturally, it is also possible to measure optical systems 20 which contain a plurality of lenses and other optical elements.

Figure 2:
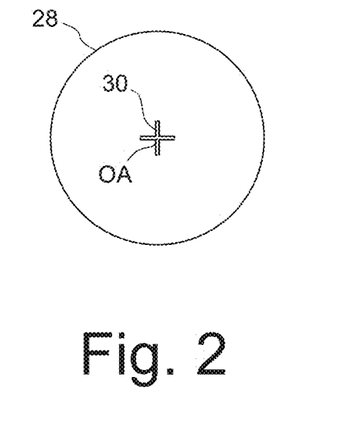
FIG. 2 shows a top view of a stop of the measuring apparatus shown in FIG. 1.

The illumination unit 12 comprises a light-pattern generation device 24, by means of which a light pattern is generable in an object plane 26. To this end, the light-pattern generation device 24 comprises a stop 28 with an aperture 30, which is shown in a top view in FIG. 2. In the depicted embodiment, the aperture 30 has the form of a reticle, i.e. a crossed arrangement of two narrow slits. The stop 28 is illuminated by a light source 32, the light of which is directed onto the aperture 30 by way of a converging lens 34. The light source 32 generates polychromatic light with a broad continuous spectrum.

Figure 3:
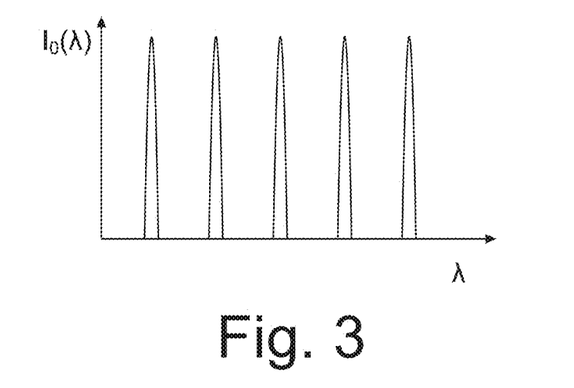
FIG. 3 shows the spectrum of the light used for the measurement when it is incident on the light sensor.

Arranged downstream of the stop 28 in the light path are a condenser 33 and a spectral filter 35. The spectral filter 35 is embodied as an optical comb filter and has a spectral transmission coefficient T(λ) which is shown qualitatively in FIG. 3. After the passage through the spectral filter 35, the polychromatic light no longer has a continuous spectrum; instead, it has a discrete spectrum. An example of a suitable optical comb filter is described in U.S. Pat. No. 5,225,930 A. However, it is also possible to use different optical comb filters, e.g. filters which are based on the principle of a Fabry-Perot interferometer. Polychromatic light with a discrete spectrum can also be generated without a comb filter if light from a plurality of light paths is superposed, with a spectral filter which only transmits the light of a specific wavelength being arranged in each light path.

The measuring unit 14 comprises a first converging lens 36, which is displaceable along an optical axis OA, and a second converging lens 38. A dispersion prism 40, as is typically contained in a prism spectrometer, and a filter wheel 42 are arranged between the converging lenses 36, 38. The two converging lenses 36, 38 image an intermediate image plane 44 on a first spatially resolving light sensor 46, the axial position of said intermediate image plane being changeable by displacing the first converging lens 36. By way of example, said light sensor can be embodied as a CCD sensor and comprises an array of pixels which detect the intensity of the incident light in a substantially wavelength-independent manner. The filter wheel 42 comprises a plurality of spectral filters 48a, 48b which are transmissive for different spectral ranges and which are arranged about a common axis. With the aid of a drive 43, the filter wheel 42 can be rotated about the common axis in such a way that at most one of the spectral filters 48a, 48b is situated in the light path.

A beam splitter 50, which via a third converging lens 52 directs part of the incident light on a second light sensor 54 which is likewise embodied as a CCD sensor, is situated in the light path between the first converging lens 36 and the filter wheel 42. Here, the first converging lens 36 and the third converging lens 52 image the intermediate image plane 44 on the second light sensor 54.

Below, the function of the measuring apparatus 10 is explained in more detail with reference to FIGS. 4 to 11.

b) Function

When the aperture 30 is illuminated with light, said aperture is imaged onto the intermediate image plane 44 by way of the condenser 33 and the optical system 20. The real intermediate image generated there is then imaged on the two light sensors 46 and 54 by way of the lenses 36 and 38 or 52. Since the intermediate image plane 44 coincides with the rear focal plane of the optical system 20, the axial position of the intermediate image plane 44 depends on the focal length of the optical system 20. In order to be able to image the intermediate image plane 44 on the light sensors 46 and 54 in sharp focus, the first lens 36 is displaced axially in such a way that the focal plane thereof coincides with the focal plane of the optical system 20. In FIG. 1, this adjustment process is indicated by a double-headed arrow. As an alternative thereto, it is also possible to axially displace the entire measuring unit 14, or use is made of a lens 36 with a variable focal length, as is the case in e.g. liquid lenses.

Figure 4:
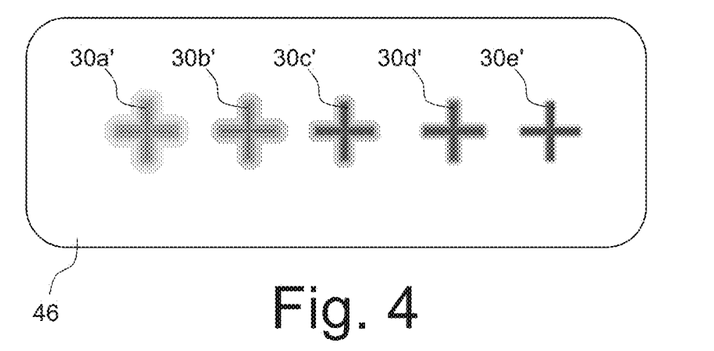
FIG. 4 shows an arrangement of a plurality of colored images of the apertures on the light sensor.

FIG. 4 shows the colored images 30a' to 30e' of the reticle-shaped apertures 30, as arise on the first light sensor as a consequence of the spectral split by way of the dispersion prism 40. Here, each one of the wavelengths shown in FIG. 3, for which the spectral filter 35 is transmissive, generates precisely one image on the first light sensor 46. Here, the images 30a' to 30e' are arranged next to one another in the plane of the paper of FIG. 1, as indicated in FIG. 1 by the light paths for three wavelengths which are colored with different degrees of darkness.

It is possible to see that the images 30a' to 30e' are not identical in FIG. 4. The relative image contrast, and hence the modulation transfer function MTF, of the optical system 20 generally depends on the wavelength of the light. Since the images 30a' to 30e' have different colors (wherein the wavelengths of the light may also lie outside of the spectrum visible to humans), there generally is a difference in the relative contrast of the images 30a' to 30e', as a result of which these have a different "washed-out" appearance on the first light sensor 46. The modulation transfer function MTF of the optical system 20 can be determined by a Fourier analysis of the images 30a' to 30e'; to be precise, this can be carried out simultaneously for all wavelengths shown in FIG. 3, without there being the need for the introduction of optical elements into the light path or for other displacement processes. If an individual gap is used as an aperture 30 instead of the reticle, it is only possible to determine the modulation transfer function MTF in one image direction. In the case of a punctiform aperture 30, values for the modulation transfer function MTF can be derived for all directions within the image plane.

Statements about the longitudinal and transverse chromatic aberrations can be derived in a manner known per se from the images 30a' to 30e'.

If the modulation transfer function MTF should be determined not only for an axial image point, but also for one or more off-axis image points, it is possible to displace the stop 28 in the aperture 30 in the object plane 26 or tilt the illumination unit 12 and repeat the measurement. Then, the light is still incident on the optical system 20 in a collimated fashion, but it is tilted with respect to the optical axis, as a result of which the colored images are also laterally displaced on the first light sensor 46.

c) Virtual Entrance Gap

In a conventional grating or prism spectrometer, an entrance gap defined by a secured physical stop is generally imaged on a light sensor. Each location of the light sensor is then assigned exactly one wavelength as a result of the dispersion of the prism or the grating.

However, in the measuring apparatus 10, the location of the image of the aperture 30 is not exactly set in the intermediate image plane 44. By way of example, if the optical system 20 is tilted or displaced slightly relative to the optical axis OA of the measuring apparatus 10, the image of the aperture 30 in the intermediate image plane 44 migrates away from the optical axis OA. Even if—as explained above—the modulation transfer function MTF should be determined for off-axis object points, the image of the aperture 30 is no longer on the optical axis OA in the intermediate image plane 44. Because of this, it is no longer possible to uniquely assign wavelengths to the locations on the first light sensor 46. Inter alia, this leads to the first light sensor 46 being unable to identify whether and to what extent a displacement of one of the images 30a' to 30e' is traced back to a tilt of the optical system 20 or an imaging property of the optical system 20 which only occurs at a specific wavelength.

Figure 5:
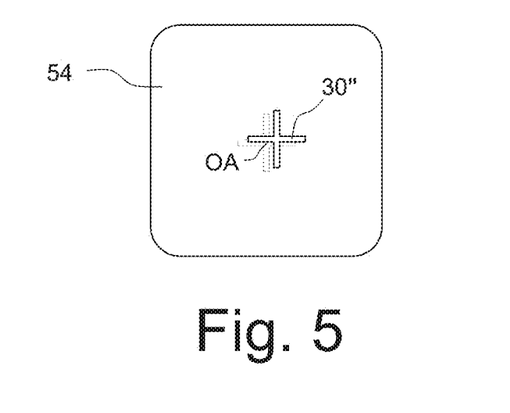
FIG. 5 shows the image of the aperture on a further light sensor.

In order to exclude uncertainties connected therewith, the image of the aperture 30 on the second light sensor 54, which is shown in FIG. 5, is used. In the case of an optical system aligned perfectly in relation to the optical axis of the measuring apparatus 10, the image of the aperture 30 would be centered on the optical axis OA, as indicated in FIG. 5 by dotted lines. In the case of a tilt of the optical system 20, the image migrates away from the optical axis OA (cf. full lines). However, the colored images 30a' to 30e' perform the same migration movement on the first light sensor 46. If the offset which was measured with the aid of the second light sensor 54 and which is traced back to e.g. a tilt of the optical system 20 is removed by calculation, wavelength-specific imaging properties of the optical system 20 can be determined with high accuracy from the position of the images 30a' to 30e' on the first light sensor 46.

Figure 6:
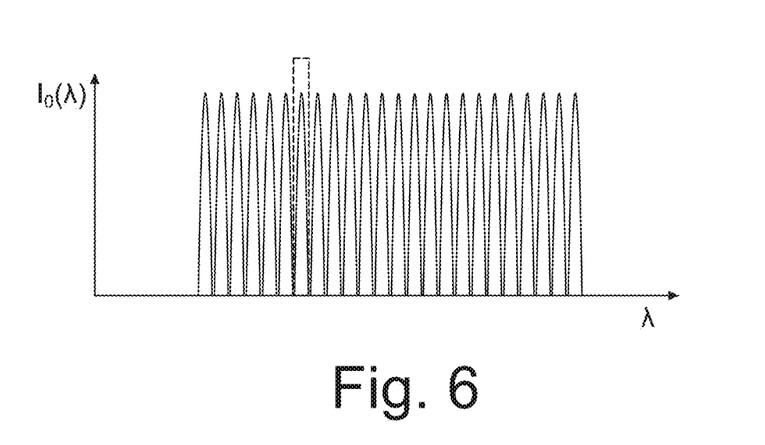
FIG. 6 shows another spectrum of the light used for the measurement when it is incident on the light sensor.
Figure 7:
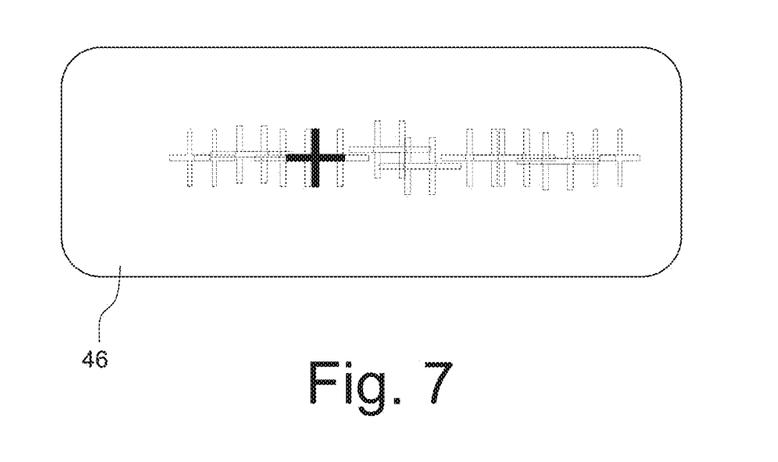
FIG. 7 shows an arrangement of the colored images of the aperture on the light sensor when using the light with the spectrum shown in FIG. 6.
Figure 8:
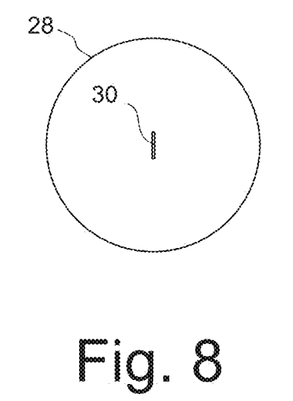
FIG. 8 shows a top view of another stop of the measuring apparatus when the latter is used in a second mode of operation for measuring the spectral transmission coefficient.
Figure 9:
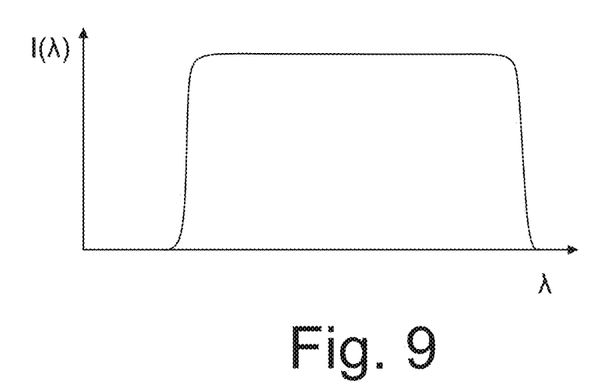
FIG. 9 shows the spectrum of the light in the second mode of operation.

If the wavelengths of the light emanating from the spectral filter 35 lie very close next to one another, as illustrated in FIG. 6, it is possible for the images of the aperture 30 to overlap on the first light sensor 46, as indicated in FIG. 7 by dotted lines. In this case, it may be difficult to determine the modulation transfer function MTF in at least one of the two image directions.

In order to highlight individual images from the first light sensor 46 by suppressing the remaining images, the filter wheel 42 can be brought into such a rotational position with the aid of the drive 43 that one of the spectral filters 48a, 48b is introduced into the light path and only passes the light with the wavelength which should be highlighted on the first light sensor 46. As a result, the unwanted images are suppressed on the first light sensor 46. If the spectral filters 48a, 48b are likewise embodied as comb filters, the period of which however is an integer multiple of the period of the spectral filter 35, it is also possible to make available whole groups of colored images on the light sensor 46.

d) Measuring the Spectral Transmission Coefficient

With the aid of the measuring apparatus 10, it is moreover possible to measure the spectral transmission coefficient $T(\lambda)$ of the optical system 20. To this end, use is made of a stop 28 with an aperture 30, which is embodied as an individual slit and shown in FIG. 8. Moreover, the spectral filter 35 is removed from the light path such that light with a continuous spectrum (cf. FIG. 9) is incident on the light sensors 46 and 54.

Figure 10:
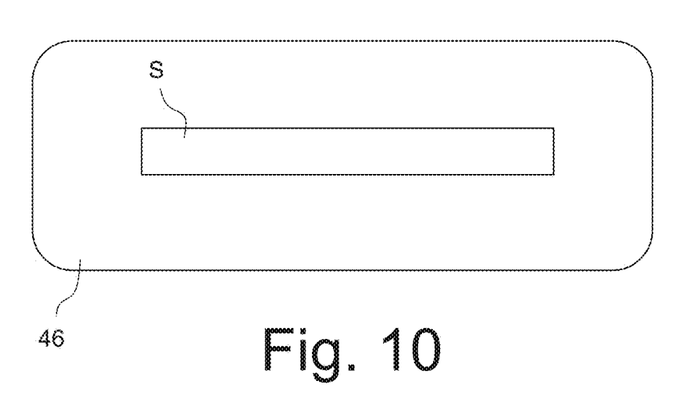
FIG. 10 shows a schematic illustration of the light distribution on the light sensor in the second mode of operation.
Figure 11:
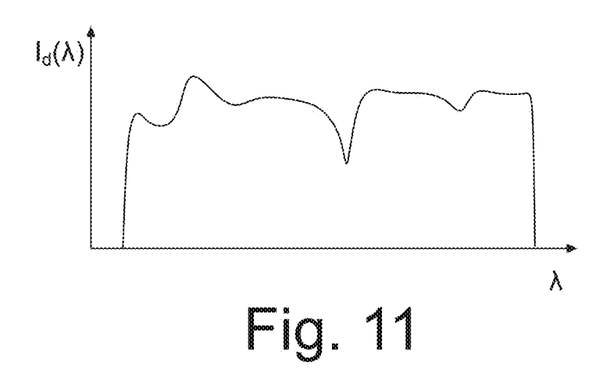
FIG. 11 shows an exemplary spectral intensity distribution of the light when it is incident on the light sensor in the second mode of operation.

Accordingly, the images of the aperture 30 also superpose continuously on the light sensor 46. This leads to a strip-shaped intensity distribution S on the first light sensor 46, as illustrated in FIG. 10. However, since the optical system generally has a transmission coefficient T which is wavelength-dependent, the intensities of the light within the strip S are not constant, but vary over the longitudinal direction thereof. Since the longitudinal positions corresponded to wavelengths, it is possible to directly calculate the dependence of the detected intensity $I_d(\lambda)$ on the wavelength $\lambda$, as shown in FIG. 11, from the local intensity profile acquired by the first light sensor 46. From this dependence, conclusions about the spectral transmission coefficient $T(\lambda)$ can be drawn directly if the intensity profile of the light is known prior to the passage through the optical system 20.

2. Second Embodiment

Figure 12:
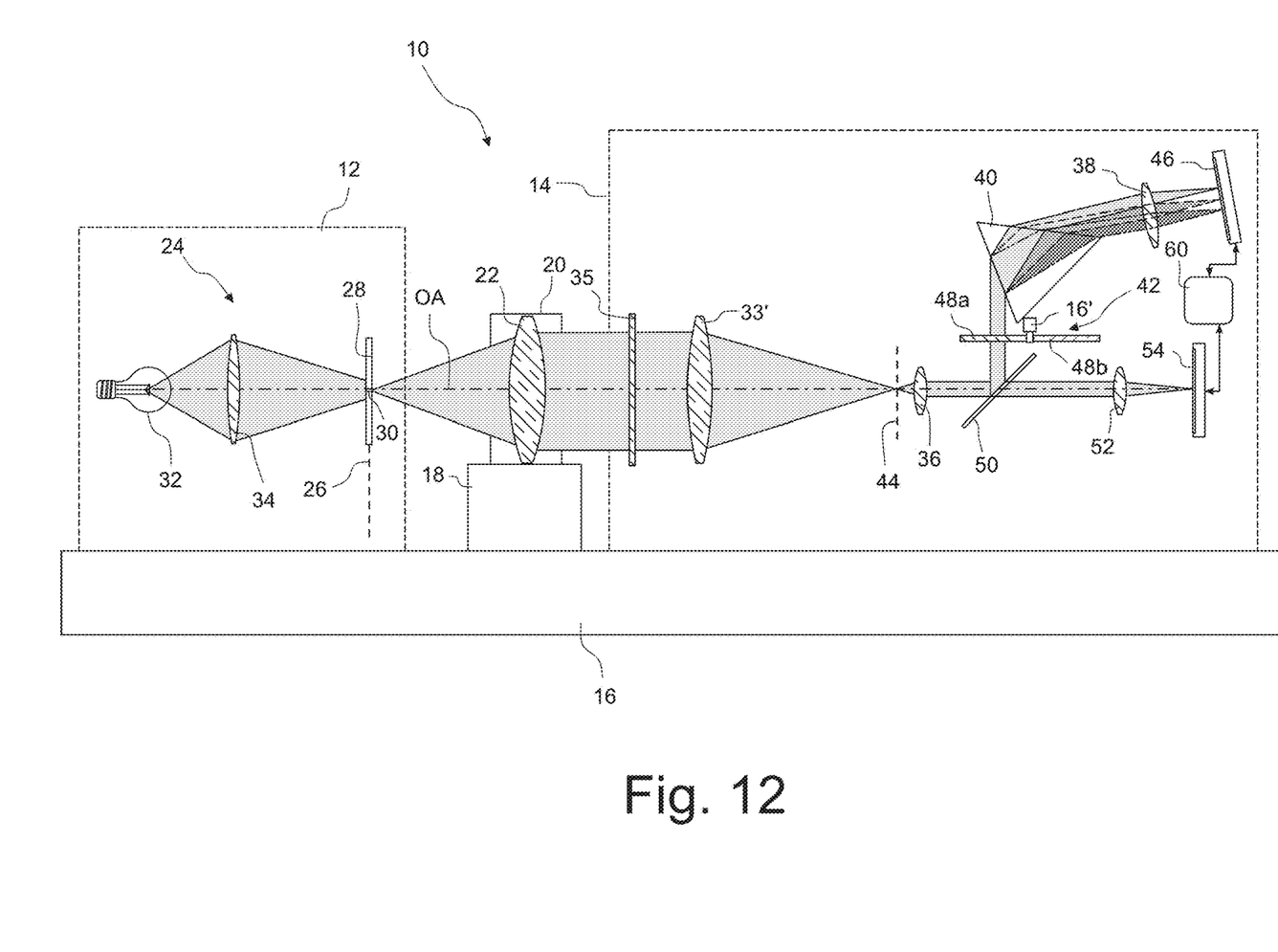
FIG. 12 shows an illustration of a measuring apparatus, based on FIG. 1, in accordance with a second embodiment of the invention.

In an illustration based on FIG. 1, FIG. 12 shows a measuring apparatus 10 in accordance with a second embodiment. There, the optical system 20 is arranged in such a way that the front focal plane thereof coincides with the object plane 26 in which the stop 28 is arranged. In this embodiment, the spectral filter 35 and a condenser 33' which, together with the optical system 20, images the object plane 26 onto the intermediate image plane 44 are situated in the collimated beam path downstream of the optical system.

Otherwise, the function of the measuring apparatus 10 corresponds to that of the first embodiment.

While specific embodiments of the invention have been shown and described in detail to illustrate the inventive principles, it will be understood that the invention may be embodied otherwise without departing from such principles.

We claim:

1. An apparatus for measuring a wavelength-dependent optical characteristic of an optical system, comprising:
   a) a light-pattern generation device configured to generate a pattern of polychromatic light in an object plane;
   b) a spatially resolving light sensor;
   c) a measuring optical unit configured, together with the optical system, to image the object plane on the light sensor;
   d) a dispersive optical element arranged in a light path between the optical system and the light sensor so that a plurality of images of the pattern with different wavelengths are generated simultaneously on the light sensor; and e) an evaluation device configured to determine the wavelength-dependent characteristic of the optical system from the plurality of images.

2. The apparatus according to claim 1, wherein the optical system, together with the measuring optical unit, generates an intermediate image of the pattern which is imaged on the light sensor.

3. The apparatus according to claim 2, further comprising a further spatially resolving light sensor, wherein the measuring optical unit is configured, together with the optical system, to additionally image the object plane on the further light sensor, with no dispersive optical element being arranged in the light path of the further light sensor.

4. Apparatus according to claim 3, wherein the evaluation device is configured to derive wavelength-independent information from the image of the pattern on the further light sensor and use the information to correct the spatial information obtained by the light sensor.

5. The apparatus according to claim 1, wherein the polychromatic light comprises a discrete spectrum or a plurality of continuous spectra, which are spectrally spaced apart.

6. The apparatus according to claim 1, wherein the polychromatic light comprises a continuous spectrum.

7. The apparatus according to claim 1, further comprising a spectral filter is arranged between the optical system and the light sensor.

8. The apparatus according to claim 7, wherein the spectral filter is arranged in an interchange holder, at least one further spectral filter being arranged in the interchange holder, the at least one further spectral filter having different spectral properties than the spectral filter.

9. The apparatus according to claim 1, wherein the measuring optical unit comprises a portion that is arranged between the light-pattern generation device and the optical system, wherein said portion is configured to illuminate the optical system with collimated light.

10. The apparatus according to claim 9, wherein the measuring optical unit has a condenser having a focal plane in which the pattern is arranged.

11. The apparatus according to claim 9, wherein a part of the measuring optical unit arranged between the optical system and the light sensor has a focal plane which is axially adjustable.

12. The apparatus according to claim 1, wherein the optical system generates an intermediate image of the pattern lying at infinity, wherein the intermediate image is imaged on the light sensor by the measuring optical unit.

13. An apparatus for measuring a wavelength-dependent optical characteristic of an optical system, comprising:
a) a light-pattern generation device configured to generate a pattern of polychromatic light in an object plane;
b) a spatially resolving light sensor;
c) a measuring optical unit configured, together with the optical system, to image the object plane on the light sensor;
d) a dispersive optical element arranged in a light path between the optical system and the light sensor so that a plurality of images of the pattern with different wavelengths are generated simultaneously on the light sensor; and e) an evaluation device configured to determine the wavelength-dependent characteristic of the optical system from the plurality of images, wherein the optical characteristic is selected from the group consisting of: spectral modulation transfer function, spectral transmission coefficient, longitudinal chromatic aberration, and transverse chromatic aberration.

14. A method for measuring a wavelength-dependent optical characteristic of an optical system, comprising the steps of:
a) generating a pattern of polychromatic light in an object plane;
b) imaging the pattern on a spatially resolving light sensor using the optical system and a measuring optical unit, with a dispersive optical element being situated in a light path between the optical system and the light sensor such that a plurality of images of the pattern with different wavelengths are generated simultaneously on the light sensor; and
c) determining the optical characteristic from the plurality of images on the light sensor.

15. The method according to claim 14, wherein the optical system, together with the measuring optical unit, generates an intermediate image of the pattern which is imaged on the light sensor.

16. The method according to claim 15, wherein the measuring optical unit, together with the optical system, additionally images the object plane on a further light sensor, with no dispersive optical element being arranged in the light path of the further light sensor.

17. The method according to claim 16, including deriving wavelength-independent information from the image of the pattern on the further light sensor and using the derived information to correct spatial information obtained by the light sensor.

18. The method according to claim 14, wherein the polychromatic light comprises a discrete spectrum or a plurality of continuous spectra, which are spectrally spaced apart.

19. The method according to claim 14, wherein the polychromatic light comprises a continuous spectrum.

20. The method according to claim 14, wherein the light is spectrally filtered between the optical system and the light sensor.

21. The method according to claim 14, wherein the measuring optical unit comprises a portion that is arranged between the light-pattern generation device and the optical system, wherein said portion illuminates the optical system with collimated light.

22. The method according to claim 14, wherein the optical system generates an intermediate image of the pattern lying at infinity, which intermediate image is imaged on the light sensor by the measuring optical unit.

23. The method according to claim 14, wherein the at least one optical characteristic is selected from the group consisting of: spectral modulation transfer function, spectral transmission coefficient, longitudinal chromatic aberration, and transverse chromatic aberration.

* * * * *